United States Patent [19]

Margaliot et al.

[11] Patent Number: 5,117,120
[45] Date of Patent: May 26, 1992

[54] METHOD AND APPARATUS FOR DETECTING FLAWS IN TRANSPARENT BODIES CAUSED BY HEAVY PARTICLES OF RADIOACTIVE DECAY

[75] Inventors: Menachem Margaliot, Bnei Braq; Tuvia Schlesinger, Rehovot, both of Israel

[73] Assignee: The State of Israel, Atomic Energy Commission, Soreq Nuclear Research Center, Israel

[21] Appl. No.: 638,357

[22] Filed: Jan. 4, 1991

Related U.S. Application Data

[63] Continuation-in-part of Ser. No. 556,574, Jul. 20, 1990, abandoned, which is a continuation of Ser. No. 320,415, Mar. 8, 1989, abandoned.

[30] Foreign Application Priority Data

Mar. 24, 1988 [IL] Israel ......................................... 85851

[51] Int. Cl.[5] .............................................. G01N 21/88
[52] U.S. Cl. .................................. 250/572; 250/472.1
[58] Field of Search .............. 250/571, 572, 562, 563, 250/223 B, 472.1, 473.1, 474.1, 475.2; 356/239, 240

[56] References Cited

U.S. PATENT DOCUMENTS

| | | | |
|---|---|---|---|
| 3,652,863 | 3/1972 | Gaskell et al. | 356/239 |
| 3,770,962 | 11/1973 | Fleischer et al. | 250/472.1 |
| 3,988,068 | 10/1976 | Sprague | 356/239 |
| 4,401,893 | 8/1983 | Dehuysser | 250/572 |
| 4,808,813 | 2/1989 | Champetier | 250/223 B |
| 4,841,139 | 6/1989 | Schmalfuss et al. | 356/239 |

*Primary Examiner*—David C. Nelms
*Attorney, Agent, or Firm*—Steinberg & Raskin

[57] ABSTRACT

Method and apparatus for measuring energetic, heavy ionizing particles, such as α-particles and protons in gaseous surroundings by scanning a transparent plate that had been exposed to radiation and then subjected to chemical etching with a focused laser light beam, and counting by means of computerized counting means laser light pulses emerging at the edge of the plate in consequence of total internal reflection of laser light scattered by radiation-induced etching pits.

8 Claims, 4 Drawing Sheets

METHOD AND APPARATUS FOR DETECTING FLAWS IN TRANSPARENT BODIES CAUSED BY HEAVY PARTICLES OF RADIOACTIVE DECAY

CROSS REFERENCE TO RELATED APPLICATIONS

This application is a continuation in part of Ser. No. 07/556,574, filed Jul. 20, 1990, now abandoned, which in turn is a continuation of Ser. No. 07/320,415, filed Mar. 8, 1989, now abandoned.

FIELD OF THE INVENTION

The present invention concerns method and apparatus for measuring in gaseous surroundings energetic, heavy ionizing particles resulting from radioactive decay such as α-particles and protons, by counting radiation induced etching pits on the surface of a transparent plate or foil having two parallel surfaces. Typically, the invention is applicable to the performance of solid state nuclear track detection (SSNTD) in integrative measurements of the radioactive gas radon.

BACKGROUND OF THE INVENTION

In the following description and claims the term "plate" will be used generically to describe objects which qualify under any of the terms plate, foil and sheet. Moreover, where in the following description and claims there is reference to an incidence angle of a focused laser light beam, this is to be understood as meaning the angle between an imaginary axis of the converging portion of the incident beam and the irradiated surface.

Radon-222 is a radioactive gas, which is produced as the decay product of the teressial Radium-226. This radioactive gas is present in the atmosphere, and forms radioactive decay series, including two radio-isotopes (Po-218 and Po-214) which are α-emitters. The α-emitters enter the respiratory system in the normal breathing process, thus exposing the respiratory tract to energetic α-particles.

Radon is widely recognized as the major (>50%) source of ionizing radiation exposure to the general public, and it is estimated that some 10,000 cases of fatal lung cancer are caused annually in the U.S. alone by this carcinogenic agent.

The first step in reducing the exposure to radon is the identification of high-radon locations based on measurements of the radon level. A variety of methods exist for the measurement of radon, which can be classified by the air sampling period, ranging from a few minutes for grab-sampling, via a few days for semi-integrative measurements, and up to a full year for integrative measuring methods.

As the radon level in a given location is known to fluctuate, short sampling periods may yield misleading results, and thus it is widely accepted that the epidemiologically most significant results are obtained by fully-integrative radon-level measurements.

Of the various integrative radon measuring methods, SSNTD is the most prominent one. This method is based on the phenomenon that the passage in matter of an energetic, heavy ionizing particle such as an α-particle or a proton, results in a high linear energy transfer (LET) to the matter, of the order of 100 MeV/(g/cm$^2$). This high amount of energy is capable of damaging the chemical bonds in the track of the particle in the exposed material and where such material is a crystalline or polymeric solid body, the damage to the chemical bonds in the track of the particle may result in an observable change in the local properties of the material. One such change is a local reduction in the material's resistance to chemical etching. In consequence the etching process at the tracks of the particles will proceed at a higher rate than at the undamaged sites of the body, which results in the formation of small etching pits at the sites where the ionizing particles entered the body.

Thus SSNTD comprises exposure of a suitable transparent plate to ionizing radiation for the purpose of inducing localized change of the plate followed by chemical etching, and counting the resulting pits.

Conventionally, in the performance of SSNTD the radiation exposure is estimated by observing the density of the radiation-induced etching pits in it. Many methods have been proposed for the counting of these pits, the most advanced of which is the application of a computerized image analyzer. As the application of this method is rather expensive, most current SSNTD techniques are based on human observation and counting of these pits under a microscope.

SSNTD may also be used for the measurement of neutron radiation which may be present in areas that had been afflicted by an atomic explosion or spillage, or in active nuclear reactors.

It is the object of the present invention to provide method and means for a reliable etching pit count in the performance of radiation measurements in gaseous surroundings by SSNTD.

SUMMARY OF THE INVENTION

When a focused laser beam falls on a transparent plate with two parallel surfaces and hits an undamaged area thereof, the incident beam is transmitted across the plate with only little scattering. Where the beam falls on a pit in the surface of the plate a significant part of the light is scattered and captured within the body in consequence of total internal reflection and exits the transparent plate via its edges. The phenomenon is particularly pronounced at an incidence angle of 90° but is significant also at other incidence angles. The physical condition for the occurrence of total internal reflection is that the light be scattered at an angle equal to or greater than the critical angle of the transparent material and this can be expressed by the following equation:

$$\theta = \arcsin(1/N)$$

where $\theta$ is the critical angle and $N$ is the refractive index of the transparent material. For common glass $N$ is about 1.5 and $\theta$ is about 41°.

It has been found in accordance with the present invention that radiation-induced pits on the surface of a transparent plate do scatter a focused laser light beam at incidence angles exceeding 40° leading to total internal reflection in the plate, and are thus detectable on that basis.

In accordance with the invention there is provided a method of measuring energetic, heavy particles resulting from radioactive decay, in a gaseous environment, comprising exposing a transparent plate with smooth parallel surfaces to said gaseous environment, subjecting the exposed plate to chemical etching, scanning a surface of the chemically etched plate with a focused laser light beam and counting by means of computerized pulse counter means laser light pulses emerging at at least one edge of the plate.

The method according to the invention was found suitable for the measurement of radon gas in a given environment and also the measurement of neutron radiation.

If desired, chemical etching of the exposed plate may be enhanced by the application of an alternating electric field essentially normal to the plate. Such an alternating electric field may, for example, have a frequency of about 1.8 kHz and an intensity of about 25 kV/cm.

In a preferred embodiment of the invention the incidence angle of the focused laser beam on the surface of the plate is about 90°.

By scanning the etched plate in the manner specified, radiation-induced etching pits in the surface are detected and counted. Essentially, such detection and counting is effected by laser light detectors known per se, e.g. fast photo-diodes which produce moderate electric signals in response to the laser light pulses. Preferably these electric signals are fed to a signal level amplifier-discriminator which rejects all signals lower than a preset level, whereby background noises due to intrinsic total internal reflection of some of the laser light are eliminated.

The scanning and counting operations performed in accordance with the invention are computerized. The counting operation of the computer may be programmed to make allowance for the geometry of the pits. For example, in case of axisymmetrical pits, e.g. conical, scattering of the incident focused laser light beam is essentially symmetrical and each such pit will produce detectable simultaneous laser light pulses at all four edges of the plate. As radiation-induced etching pits are mostly axisymmetrical it is preferred, in accordance with the invention, to discriminate between background etching pits resulting from intrinsic flaws in the plate surface and radiation-induced etching pits, by so programming the pulse counter that there are counted only all-round laser light pulses resulting from axisymmetrical pits, while pulses that emerge only at part of the circumference and result from axisymmetrical pits are rejected. In practising this preferred embodiment, laser light detectors must be placed near all four edges of the plate.

In the application of SSNTD for the quantitative detection of atmospheric radiation such a radon in accordance with the invention, a transparent plate is required that is stable under environmental conditions for long periods of one year or more; it must, moreover, be very resistant to etching unless irradiated by high LET particles, such as α-particles and protons; the radiation damage of the plate should be incurable under normal environmental conditions; and finally the radiation-induced etching pits should be readily detectable and countable.

Preferred materials that comply best with all these requirements are poly carbonates such as poly allyl diglycol carbonate known commercially as CR-39.

Typically, the thickness of transparent plates used in the performance of the invention is within the range of about 0.1 to about 1.2 mm, the range of about 0.4 to about 0.6 mm being preferred.

Similar as in conventional SSNTD methods, the plate is exposed to the ambient air, and thus to the ambient ionizing radiation, in a suitable exposure can into which the air enters via a suitable filter to prevent dust entry. The minimal dimensions of the can must provide in all directions a free path equal to the maximal range of the most energetic ionizing particles emitted by the radiation progeny, such range in the case of radon being about 8 cm.

The exposure may last from a few weeks up to a year. After termination of the exposure, the plate is etched, a suitable chemical etching agent being, for example, 5N aqueous KOH containing about 13% by weight of ethyl alcohol. Typically, etching is first effected for 8 hours at 65° C., followed by additional 10 hours at 25° C. If desired, an alternating electric field of say 25 kV/cm (rms) may be applied perpendicular to the SSNTD plate at a frequency of about 1.8 khz. In such a case the etching period is shortened to about 5 hours only, the etching temperature being about 60° C.

With currently used CR-39 foils, a 24 h exposure of the SSNTD foil in a suitable exposure can to air having a radon concentration of 1 pCi/l, will upon etching produce 6 pits/cm$^2$. This linear relation holds up to an integral exposure of 3000 pCi/l.day.

The invention also provides an apparatus for use in the measurement of energetic, heavy ionizing particles by counting radiation-induced etching pits on the surface of a transparent plate that had been exposed to such radiation, and was then subjected to chemical etching, which apparatus comprises in combination:
  i) a source of a focused laser light beam;
  ii) means for holding said plate so as to face said focused laser light beam and at such a distance therefrom as to coincide with the focus thereof;
  iii) means for scanning said plate with said focused laser light beam; and
  iv) computer means for counting laser light pulses at at least one edge of said transparent open body.

In a preferred embodiment of the apparatus according to the invention said means for holding said transparent plate are adapted to hold the plate in a position in which the incidence angle of said focused laser light beam is about 90°.

Preferably, said means for detecting laser light pulses are associated with amplifier-discriminator means which reject electric pulses generated by the detector means that are below a preset intensity, whereby background noises due to intrinsic total internal reflection of the laser light are filtered out.

Preferably, said computer means for counting laser light pulses are so programmed that there are counted only all-round laser light pulses resulting from axisymmetrical pits while pulses that emerge only at part of the circumference and resulting from axisymmetrical pits are rejected.

DESCRIPTION OF THE DRAWINGS

For better understanding the invention will now be described, by way of example only, with reference to the annexed drawings to which the invention is not limited and in which.

DESCRIPTION OF A PREFERRED EMBODIMENT

Figure 1:
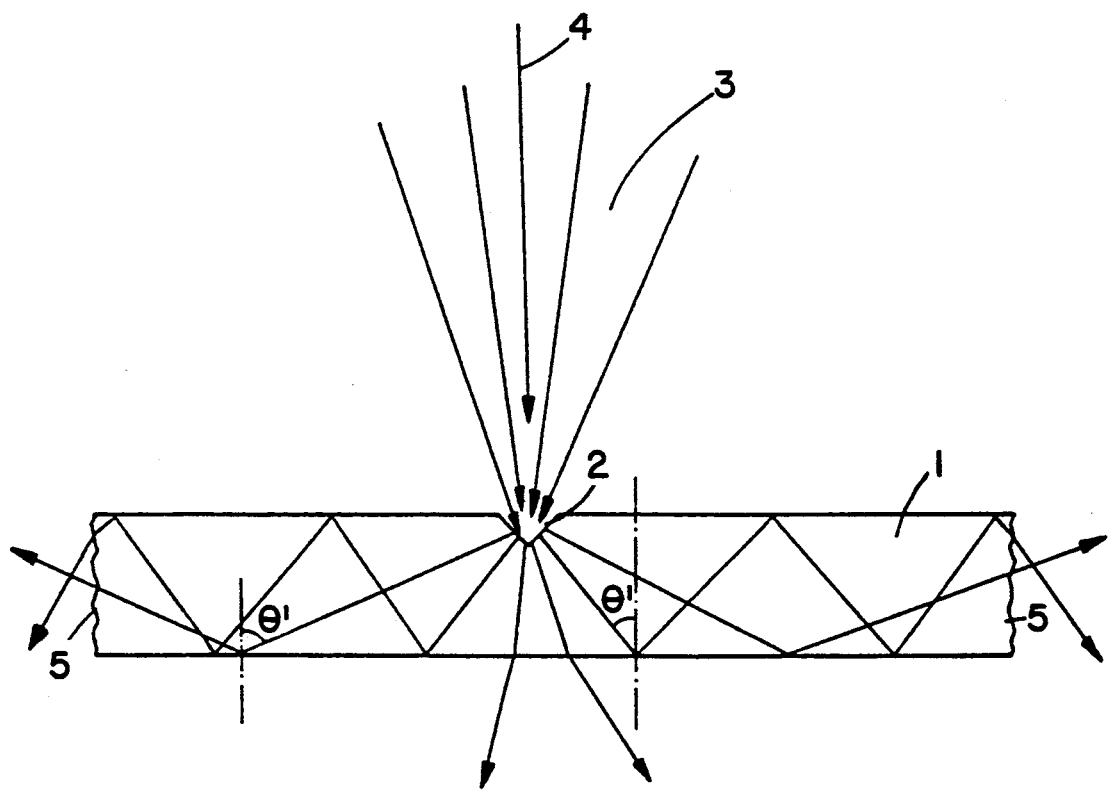
FIG. 1 is a diagrammatic illustration of the manner in which an incident focused laser light beam is partly scattered by a pit in a transparent plate.

As shown in FIG. 1 a transparent SSNTD plate 1 having radiation induced etching pits such as pit 2, is irradiated by a converging laser beam 3 focused onto the surface of the plate such that its imaginary axis 4 is normal to the surface of the plate. When the focused laser light beam 3 falls on an undamaged area of the transparent plate 1, the beam is transmitted with nearly no scattering. When, however, the beam falls onto a pit 2, it is partly scattered in the manner shown and all those scattered rays which form with the normal an angle $\theta'$ that is equal to or larger than the critical angle $\theta$ defined by the formula:

$$\theta = \arcsin(1/N)$$

where N is the refraction index of plate 1, are totally reflected at the two parallel surfaces of plate 1 and emerge at the edges 5 of plate 1. Assuming plate 1 to be a square having four equal edges 5 and pit 2 to be axisymmetrical, beam 3 falling onto a pit 2 in the manner shown produces simultaneously all round pulses at all edges 5. If, however, a pit 2 is not axisymmetrical, the scattering of the incident laser light in plate 1 in consequence of total reflection is unsymmetrical with the result that detectable laser light pulses will be produced at only part of the edges 5.

Figure 2:
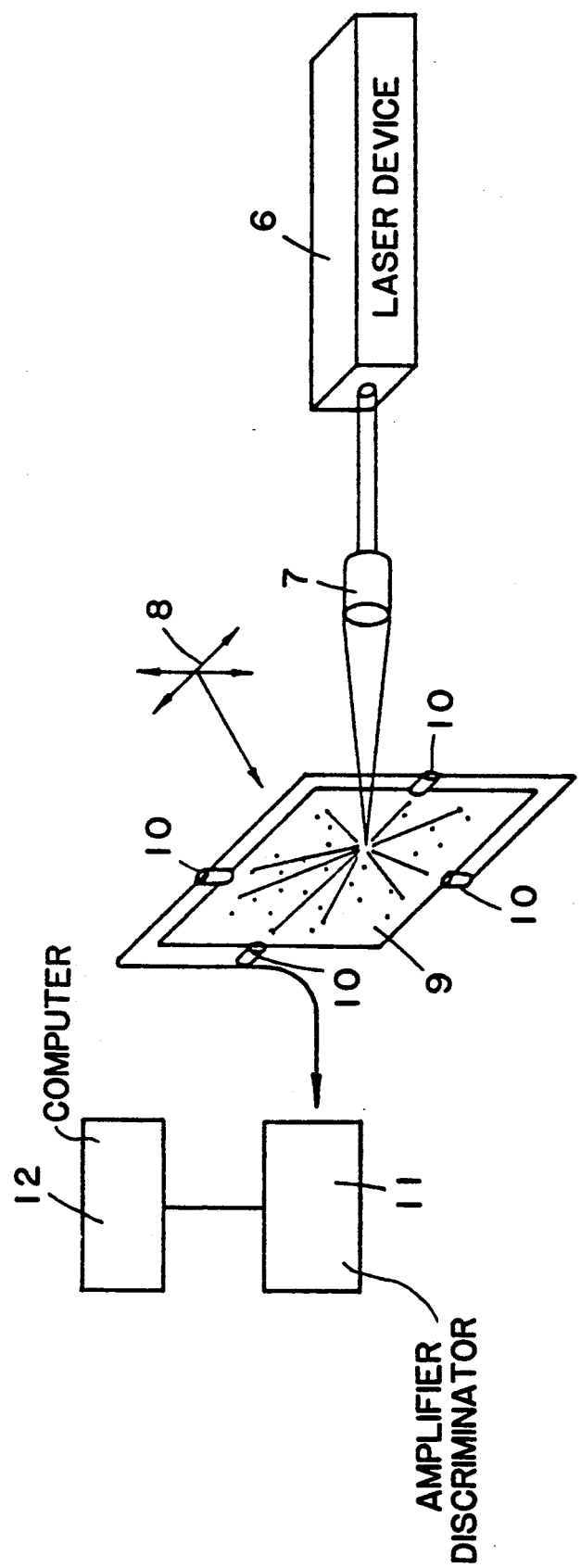
FIG. 2 is a logical block diagram of an apparatus according to the invention.

The apparatus diagrammatically shown in FIG. 2 comprises a laser device 6, e.g. of the HeNe type, fitted with a focusing unit 7 and an X-Y scanner unit diagrammatically shown at 8.

The apparatus further comprises means for holding a transparent plate 9 in the focal plane of the laser unit 6, 7 in association with photo-diodes 10. Photo-diodes 10 may either be of the type that generates electric pulses upon irradiation by laser light or of the type that is permanently connected to a source of electric power with the output being modulated upon irradiation by laser light.

All photo-diodes 10 are connected in parallel via an amplifier-discriminator unit 11 to a computer 12. Computer 12 is also linked to the scanner unit 8 in a known manner (not shown).

Figure 3:
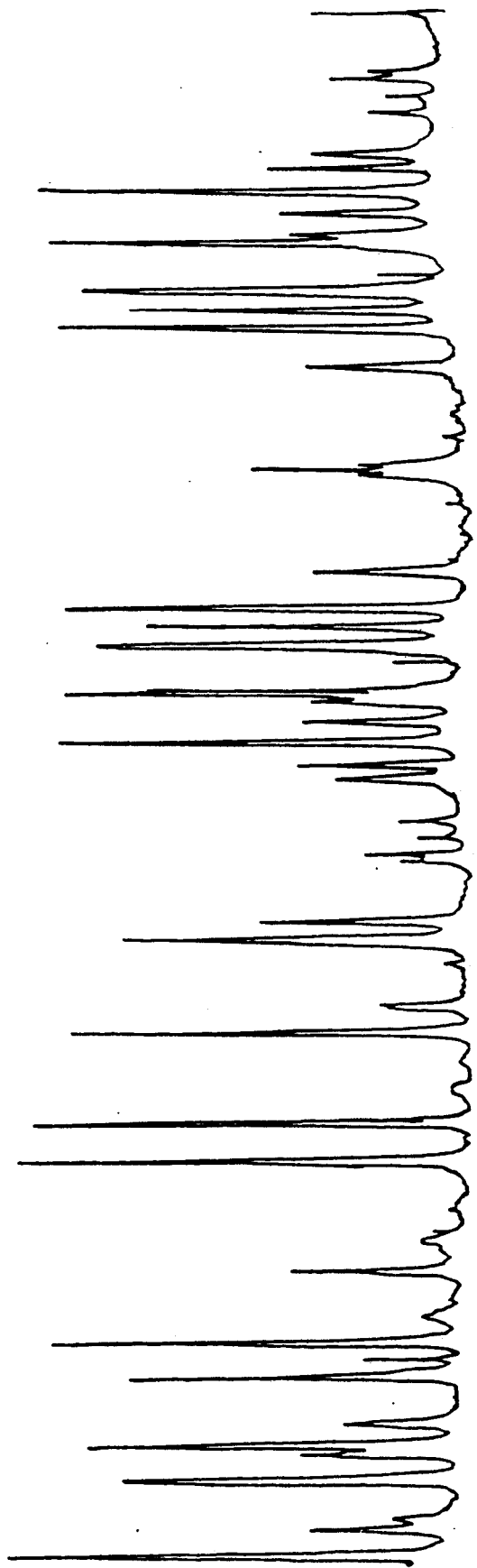
FIG. 3 is a diagram showing the pulsating electric signals from a single photo-diode detector in an apparatus according to FIG. 2.
Figure 4:
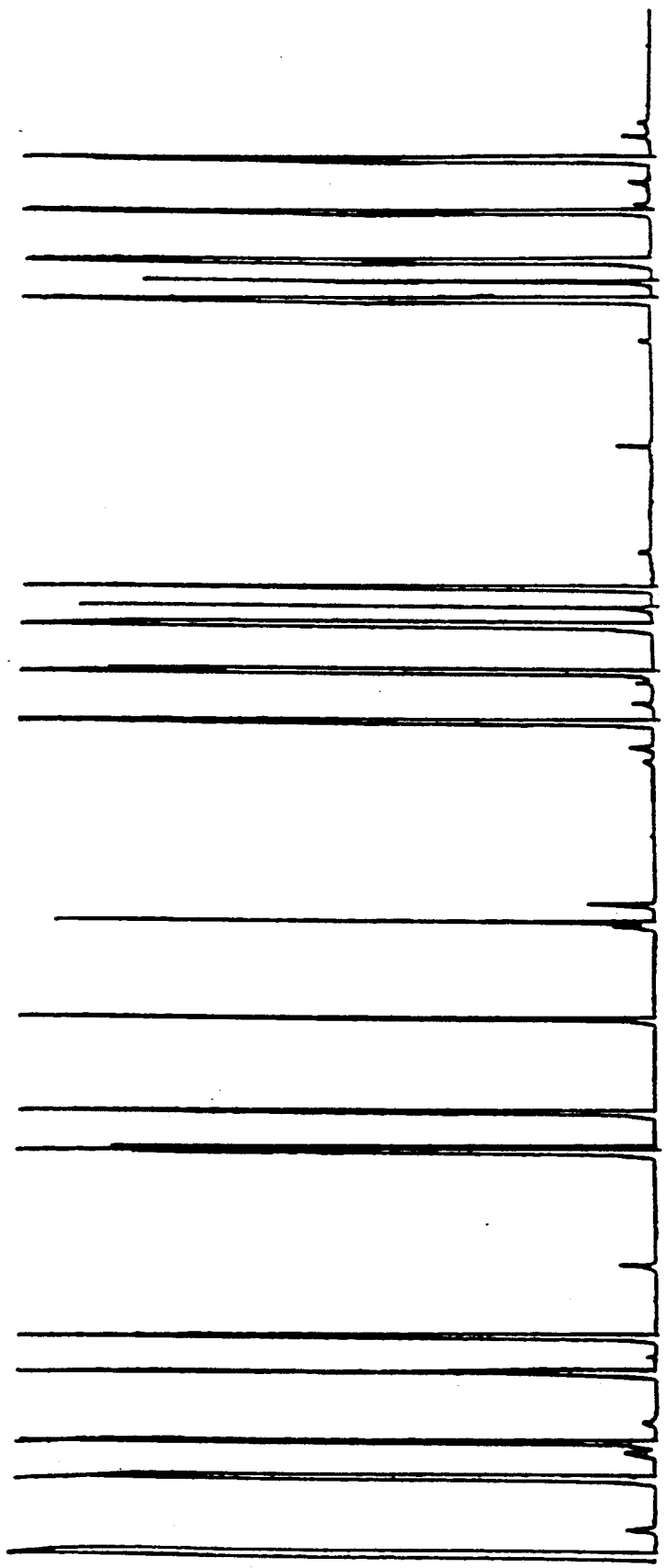
FIG. 4 is a diagram showing signals obtained by discrimination and amplification of the signals of FIG. 3.

FIG. 3 shows the signals from a photo-diode 10 before amplification and discrimination and as can be seen the succession of signals comprises a considerable number of low intensity signals resulting from stray rays due to intrinsic scattering and not to any surface flaws. Upon discrimination and amplification in the amplificator-discriminator unit 11 a succession of discrete scan signals is produced as shown in FIG. 4.

Plate 1 may, for example, be a plastic foil having a thickness of from 0.5–1.2 mm. Assuming the base diameter of the conical pits 2 to be of the order of 10 to 50$\mu$ the focus spotsize of the converging laser beam 3 may be of the order of 10$\mu$ diameter which ensures detection of all pits 2.

We claim:

1. A method of measuring in a gaseous environment energetic heavy particles resulting from radioactive decay, comprising exposing a transparent plate with smooth parallel surfaces and edges from one parallel surface to the other to said gaseous environment, subjecting the exposed plate to chemical action, scanning a parallel surface of the chemically active plate with a focused laser light beam, and counting by means of computerized pulse counter means laser light pulses which are detected emerging at at least one edge of the plate.

2. The method of claim 1, wherein the incidence angle of the focused laser light beam is about 90°.

3. The method of claim 1 wherein an alternating electric field is applied during the chemical etching.

4. The method of claim 1 wherein said computerized pulse counting means are so programmed that there are counted only all-round laser light pulses resulting from pits axisymmetrical to the surface while pulses that emerge only at part of the circumference and resulting from non-axisymmetrical pits are rejected, whereby pulses from axisymmetric radiation induced etching pits are discriminated from background noises resulting from intrinsic flaws in the plate surface.

5. An apparatus for use in the measurement of energetic, heavy ionizing particles by counting radiation-induced etching pits on a surface of a transparent plate having parallel surfaces and edges from one surface to the other and that had been exposed to such radiation, and was then subjected to chemical etching, which apparatus comprises in the combination:
  i) a source of a focused laser light beam;
  ii) means for holding said plate so as to face said focused laser light beam and at such a distance therefrom as to coincide with the focus thereof;
  iii) means for scanning said plate with said focused laser light beam; and
  iv) computer means for counting laser light pulses detected at at least one edge of said transparent open body.

6. The apparatus of claim 5, wherein said means for holding said transparent body are adapted to hold the body in a position in which the incidence angle of said focused laser light beam is about 90°.

7. The apparatus of claim 5 also comprising amplifier-discriminator means adapted to reject electric pulses generated by said laser pulse detector means that are below a preset intensity.

8. The apparatus of claim 5 wherein said computer means for counting laser light pulses are so programmed that there are counted only all-round laser light pulses resulting from pits axisymmetrical to the surface while pulses that emerge only at part of the circumference and resulting from non-axisymmetrical pits are rejected.

* * * * *